US010400929B2

(12) United States Patent
Crompton et al.

(10) Patent No.: US 10,400,929 B2
(45) Date of Patent: Sep. 3, 2019

(54) FITTING DEVICE, ARRANGEMENT AND METHOD

(71) Applicant: Quick Fitting, Inc., Warwick, RI (US)

(72) Inventors: David B. Crompton, Stonington, CT (US); Libardo Ochoa Dias, West Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 15/716,869

(22) Filed: Sep. 27, 2017

(65) Prior Publication Data
US 2019/0093807 A1    Mar. 28, 2019

(51) Int. Cl.
F16L 37/091    (2006.01)
F16L 19/08    (2006.01)

(52) U.S. Cl.
CPC .......... *F16L 37/0915* (2016.05); *F16L 19/08* (2013.01)

(58) Field of Classification Search
CPC ...................................... F16L 19/08
USPC ......... 285/39, 308, 315, 319, 340, 342, 343, 285/400, 414
See application file for complete search history.

(56) References Cited

U.S. PATENT DOCUMENTS

| 1,822,056 | A | 9/1931 | Noble |
| 1,927,390 | A | 9/1933 | Church |
| 2,132,636 | A | 10/1938 | Maahs |
| 2,201,372 | A | 5/1940 | Miller |
| 2,230,098 | A | 1/1941 | Wurzburger |
| 2,316,806 | A | 4/1943 | Parker |
| 2,398,618 | A | 4/1946 | Chavayda |
| 2,450,527 | A | 10/1948 | Smith et al. |
| 2,452,275 | A | 10/1948 | Woodling |
| 2,456,203 | A | 12/1948 | Loepsinger |
| 2,478,149 | A | 8/1949 | Wolfram |
| 2,529,821 | A | 11/1950 | Snider |
| 2,774,616 | A | 12/1956 | Dodd et al. |
| 2,917,075 | A | 12/1959 | Terry |
| 3,060,959 | A | 10/1962 | Clark |
| 3,064,983 | A | 11/1962 | Halterman |
| 3,066,961 | A | 12/1962 | Jacques |
| 3,074,747 | A | 1/1963 | Boughton |
| 3,140,107 | A | 7/1964 | Hynes |
| 3,145,730 | A | 8/1964 | Presnell |
| 3,188,122 | A | 6/1965 | Smith |
| 3,193,299 | A | 7/1965 | Gardner |
| 3,265,412 | A | 8/1966 | Reid et al. |
| 3,312,484 | A | 4/1967 | Davenport |

(Continued)

FOREIGN PATENT DOCUMENTS

| CA | 2386574 | 3/2001 |
| CN | 104154363 | 11/2014 |

(Continued)

*Primary Examiner* — James M Hewitt, II
(74) *Attorney, Agent, or Firm* — Williams Mullen; Thomas F. Bergert

(57) ABSTRACT

A push-to-connect fitting assembly, device and method allows for continual contact of inserted tubing with a main body member so as to maintain conductivity for electrical applications and a tight, rotation-restricting seal. In various embodiments, an axially internal portion of the device has an interior surface that tapers from a narrower radius to a wider radius as it extends outwardly from a tube stop element to an outer rim.

12 Claims, 3 Drawing Sheets

(56) References Cited

U.S. PATENT DOCUMENTS

| | | |
|---|---|---|
| 3,365,219 A | 1/1968 | Nicolaus |
| 3,428,337 A | 2/1969 | Read |
| 3,434,745 A | 3/1969 | Jackman |
| 3,498,647 A | 3/1970 | Schroder |
| 3,632,141 A | 1/1972 | Larsson |
| 3,633,944 A | 1/1972 | Hamburg |
| 3,659,861 A | 5/1972 | Tinsley et al. |
| 3,679,241 A | 7/1972 | Hoffmann |
| 3,709,526 A | 1/1973 | Cromie |
| 3,805,824 A | 4/1974 | Robbins |
| 3,821,670 A | 6/1974 | Thompson |
| 3,837,687 A | 9/1974 | Leonard |
| 3,885,821 A | 5/1975 | Philibert |
| 3,915,480 A | 10/1975 | Kish et al. |
| 3,986,730 A | 10/1976 | Martelli et al. |
| 4,000,919 A | 1/1977 | Edwards et al. |
| 4,009,592 A | 3/1977 | Boerger |
| 4,037,864 A | 7/1977 | Anderson et al. |
| 4,067,361 A | 1/1978 | Holloster et al. |
| 4,083,586 A | 4/1978 | Helm |
| 4,107,452 A | 8/1978 | Razvi |
| 4,123,090 A | 10/1978 | Kotsakis et al. |
| 4,135,745 A | 1/1979 | Dehar |
| 4,146,254 A | 3/1979 | Turner et al. |
| 4,178,023 A | 12/1979 | Guest |
| 4,220,361 A | 9/1980 | Brandenberg |
| 4,275,909 A | 6/1981 | Yoshizawa et al. |
| 4,288,113 A | 9/1981 | Saulnier |
| 4,305,606 A | 12/1981 | Legris |
| 4,372,586 A | 2/1983 | Rosenberg |
| 4,372,905 A | 2/1983 | Bohman |
| 4,383,552 A | 5/1983 | Baker |
| 4,437,493 A | 3/1984 | Okuda et al. |
| 4,440,424 A | 4/1984 | Mode |
| 4,466,640 A | 8/1984 | Van Houtte |
| 4,480,729 A | 11/1984 | Porter |
| 4,497,511 A | 2/1985 | Barker |
| 4,508,369 A | 4/1985 | Mode |
| 4,591,192 A | 5/1986 | Van Exel et al. |
| 4,593,943 A | 6/1986 | Hama et al. |
| 4,606,565 A | 8/1986 | Royston |
| 4,613,172 A | 9/1986 | Schattmaier |
| 4,627,644 A | 12/1986 | Ekman |
| 4,630,848 A | 12/1986 | Twist |
| 4,637,636 A | 1/1987 | Guest |
| 4,637,640 A | 1/1987 | Fournier et al. |
| 4,645,246 A | 2/1987 | Guest |
| 4,685,706 A | 8/1987 | Kowal et al. |
| 4,712,810 A | 12/1987 | Pozzi |
| 4,747,626 A | 5/1988 | Hama et al. |
| 4,801,158 A | 1/1989 | Gomi |
| 4,802,696 A | 2/1989 | Chohan et al. |
| 4,867,198 A | 9/1989 | Faust |
| 4,878,697 A | 11/1989 | Henry |
| 4,880,260 A | 11/1989 | Gotoh et al. |
| 4,895,395 A | 1/1990 | Ceriani |
| 4,919,457 A | 4/1990 | Moretti |
| 4,997,214 A | 3/1991 | Reese |
| 5,010,740 A | 4/1991 | Backus et al. |
| 5,024,468 A | 6/1991 | Burge |
| 5,052,721 A | 10/1991 | Gorman |
| 5,084,954 A | 2/1992 | Klinger |
| 5,108,134 A | 4/1992 | Irwin |
| 5,160,179 A | 11/1992 | Takagi |
| 5,181,751 A | 1/1993 | Kitamura |
| 5,230,539 A | 7/1993 | Olson |
| 5,251,655 A | 10/1993 | Low |
| 5,284,582 A | 2/1994 | Yang |
| 5,292,157 A | 3/1994 | Rubichon |
| 5,370,423 A | 12/1994 | Guest |
| 5,425,347 A | 6/1995 | Zinke, II |
| 5,443,289 A | 8/1995 | Guest |
| 5,487,572 A | 1/1996 | Combot-Courrau et al. |
| 5,511,831 A | 4/1996 | Barton |
| 5,524,936 A | 6/1996 | Barr et al. |
| 5,577,530 A | 11/1996 | Condon |
| 5,588,681 A | 12/1996 | Parks |
| 5,603,532 A | 2/1997 | Guest |
| 5,711,550 A | 1/1998 | Brandt |
| 5,722,696 A | 3/1998 | Taneya |
| 5,769,462 A | 6/1998 | Angell |
| 5,887,911 A | 3/1999 | Kargula |
| 5,911,443 A | 6/1999 | Le Quere |
| 5,957,509 A | 9/1999 | Komolrochanaporn |
| 5,983,917 A | 11/1999 | Thomas |
| 5,988,690 A | 11/1999 | Bogard |
| 5,996,632 A | 12/1999 | Vogel et al. |
| 6,012,743 A | 1/2000 | Godeau |
| 6,145,887 A | 11/2000 | Combot-Courrau |
| 6,145,893 A | 11/2000 | Kuo |
| 6,174,002 B1 | 1/2001 | Rho |
| 6,264,250 B1 | 7/2001 | Teraoka et al. |
| 6,343,814 B1 | 2/2002 | Bucher et al. |
| 6,352,439 B1 | 3/2002 | Stark et al. |
| 6,357,802 B1 | 3/2002 | Nozato et al. |
| 6,427,309 B1 | 8/2002 | Viegener |
| 6,447,109 B1 | 9/2002 | Williamson et al. |
| 6,502,866 B1 | 1/2003 | Hujisawa et al. |
| 6,517,124 B1 | 2/2003 | Le Quere |
| 6,536,470 B1 | 3/2003 | Carn et al. |
| 6,578,879 B2 | 6/2003 | Muto |
| 6,583,815 B1 | 6/2003 | Driscoll et al. |
| 6,612,623 B2 | 9/2003 | Salomon-Bahls |
| 6,634,074 B2 | 10/2003 | Wild |
| 6,685,230 B1 | 2/2004 | Bottura |
| 6,764,102 B2 | 7/2004 | Ezura |
| 6,795,113 B1 | 9/2004 | Jackson et al. |
| 6,805,385 B2 | 10/2004 | Viegener |
| 6,824,172 B1 | 11/2004 | Komolrochanaporn |
| 6,843,516 B2 | 1/2005 | Bishop et al. |
| 6,851,728 B2 | 2/2005 | Minami |
| 6,869,109 B2 | 3/2005 | Matsushita |
| 6,871,804 B2 | 3/2005 | Hagihara |
| 6,954,310 B2 | 10/2005 | Holloway et al. |
| 6,979,026 B2 | 12/2005 | Kasahara et al. |
| 6,988,509 B2 | 1/2006 | Frampton et al. |
| 6,988,746 B2 | 1/2006 | Olson |
| 7,025,392 B2 | 4/2006 | Inoue et al. |
| 7,100,948 B2 | 9/2006 | Guest |
| 7,178,836 B2 | 2/2007 | Hoff et al. |
| 7,195,287 B2 | 3/2007 | Wai |
| 7,273,235 B2 | 9/2007 | Coquard et al. |
| 7,316,429 B2 | 1/2008 | Viegener |
| 7,350,831 B2 | 4/2008 | Shimizu |
| 7,380,836 B2 | 6/2008 | Bogdanowicz et al. |
| 7,445,247 B2 | 11/2008 | Eriksen et al. |
| 7,446,247 B2 | 11/2008 | Ericksen et al. |
| 7,448,654 B2 | 11/2008 | Le Quere |
| 7,475,913 B2 | 1/2009 | Muto |
| 7,509,971 B2 | 3/2009 | Kajuch |
| 7,530,606 B1 | 5/2009 | Yang |
| 7,549,679 B2 | 6/2009 | Brosius et al. |
| 7,621,569 B2 | 11/2009 | Anthoine |
| 7,644,955 B1 | 1/2010 | Komolrochanaporn |
| 7,646,404 B2 | 1/2010 | Liu et al. |
| 7,686,346 B1 | 3/2010 | Buccicone et al. |
| 7,823,932 B2 | 11/2010 | Webb et al. |
| 7,850,208 B2 | 12/2010 | Greenberger |
| 7,862,089 B2 | 1/2011 | Crompton |
| 7,878,555 B2 | 2/2011 | Oh |
| 7,914,050 B2 | 3/2011 | Udhofer et al. |
| 7,942,161 B2 | 5/2011 | Crompton |
| 7,954,861 B2 | 6/2011 | Swift et al. |
| 8,118,331 B2 | 2/2012 | Yamashita et al. |
| RE43,490 E | 6/2012 | Gullichsen et al. |
| 8,205,915 B1 | 6/2012 | Crompton et al. |
| 8,210,576 B2 | 7/2012 | Crompton |
| 8,272,671 B2 | 9/2012 | Becker et al. |
| 8,322,755 B2 | 12/2012 | Kluss et al. |
| 8,398,122 B2 | 3/2013 | Crompton et al. |
| 8,439,404 B2 | 5/2013 | Anton et al. |
| 8,480,134 B2 | 7/2013 | Crompton et al. |
| 8,491,012 B2 | 7/2013 | LeQuere |
| 8,517,431 B2 | 8/2013 | Arning et al. |

(56) References Cited

U.S. PATENT DOCUMENTS

| | | |
|---|---|---|
| 8,585,100 B2 | 11/2013 | Stults et al. |
| 8,701,715 B1 | 4/2014 | Crompton et al. |
| 8,730,299 B1 | 5/2014 | Kozko |
| 8,764,066 B1 | 7/2014 | Rice et al. |
| 8,818,101 B1 | 8/2014 | Lim |
| 8,844,974 B1 | 9/2014 | Crompton et al. |
| 8,844,981 B1 | 9/2014 | Crompton et al. |
| 8,888,145 B1 | 11/2014 | Crompton et al. |
| 9,055,220 B1 | 6/2015 | Kozko |
| 9,068,680 B1 | 6/2015 | Crompton et al. |
| 9,086,179 B1 | 7/2015 | Komolrochanaporn |
| 9,152,019 B2 | 10/2015 | Kintner |
| 9,217,529 B2 | 12/2015 | Crompton et al. |
| 9,322,496 B1 | 4/2016 | Crompton |
| 9,416,897 B2 | 8/2016 | Crompton et al. |
| 9,521,321 B1 | 12/2016 | Kozko |
| 9,574,691 B1 | 2/2017 | Crompton |
| 9,920,866 B2 * | 3/2018 | Crompton ............... F16L 19/07 |
| 2002/0163195 A1 | 11/2002 | Vitel et al. |
| 2003/0020279 A1 | 1/2003 | Houtschilt et al. |
| 2003/0057701 A1 | 3/2003 | Koo |
| 2003/0067170 A1 | 4/2003 | Snyder et al. |
| 2003/0071460 A1 | 4/2003 | Snyder et al. |
| 2004/0061787 A1 | 4/2004 | Liu et al. |
| 2004/0070195 A1 | 4/2004 | Rohrig |
| 2004/0239115 A1 | 12/2004 | Wilk et al. |
| 2004/0245766 A1 | 12/2004 | Vallee |
| 2004/0255608 A1 | 12/2004 | Hector et al. |
| 2005/0058360 A1 | 3/2005 | Berkey et al. |
| 2005/0194785 A1 | 9/2005 | Shemtov |
| 2005/0225087 A1 | 10/2005 | McMahon et al. |
| 2006/0056056 A1 | 3/2006 | Ahiska et al. |
| 2006/0163870 A1 | 7/2006 | Gollot |
| 2006/0202478 A1 | 9/2006 | Guest |
| 2007/0075542 A1 | 4/2007 | Glaze et al. |
| 2007/0236595 A1 | 10/2007 | Pan et al. |
| 2008/0024594 A1 | 1/2008 | Ritchey |
| 2008/0143103 A1 | 6/2008 | Kiely |
| 2008/0309081 A1 | 12/2008 | De Wilde |
| 2009/0002797 A1 | 1/2009 | Kwong et al. |
| 2009/0021001 A1 | 1/2009 | Oh |
| 2009/0273130 A1 | 11/2009 | Armstrong et al. |
| 2009/0278346 A1 | 11/2009 | O'Brien |
| 2009/0278347 A1 | 11/2009 | Kerin et al. |
| 2010/0002071 A1 | 1/2010 | Ahiska |
| 2010/0033551 A1 | 2/2010 | Agarwala et al. |
| 2010/0045773 A1 | 2/2010 | Ritchey |
| 2010/0097442 A1 | 2/2010 | Lablans |
| 2010/0119172 A1 | 5/2010 | Yu et al. |
| 2010/0253064 A1 | 10/2010 | Le Quere |
| 2011/0002544 A1 | 1/2011 | Oshima |
| 2011/0032368 A1 | 2/2011 | Pelling |
| 2011/0049875 A1 | 3/2011 | Stults et al. |
| 2011/0101685 A1 | 5/2011 | Lai |
| 2011/0211040 A1 | 9/2011 | Lindemann et al. |
| 2012/0001414 A1 | 1/2012 | Arning et al. |
| 2012/0044391 A1 | 2/2012 | Ni et al. |
| 2012/0169039 A1 | 7/2012 | Crompton et al. |
| 2012/0169842 A1 | 7/2012 | Chuang et al. |
| 2012/0200081 A1 | 8/2012 | Reznar et al. |
| 2012/0242788 A1 | 9/2012 | Chuang et al. |
| 2012/0257008 A1 | 10/2012 | Taylor |
| 2012/0273709 A1 | 11/2012 | Zhang |
| 2012/0284994 A1 | 11/2012 | Crompton et al. |
| 2013/0168959 A1 | 7/2013 | Turk |
| 2013/0241198 A1 | 9/2013 | Eaton et al. |
| 2013/0258044 A1 | 10/2013 | Betts-Lacroix |
| 2013/0278715 A1 | 10/2013 | Nutsch et al. |
| 2013/0321569 A1 | 12/2013 | Agarwala et al. |
| 2013/0329002 A1 | 12/2013 | Tico |
| 2014/0002588 A1 | 1/2014 | Ahiska |
| 2014/0021717 A1 | 1/2014 | Burke et al. |
| 2014/0049609 A1 | 2/2014 | Wilson et al. |
| 2014/0062078 A1 | 3/2014 | Weissmann |
| 2014/0210940 A1 | 7/2014 | Barnes |
| 2014/0265321 A1 | 9/2014 | DeCesare et al. |
| 2014/0267586 A1 | 9/2014 | Aguilar et al. |
| 2014/0267596 A1 | 9/2014 | Geerds |
| 2014/0313377 A1 | 10/2014 | Hampton |
| 2015/0103197 A1 | 4/2015 | Djordjevic et al. |
| 2015/0137515 A1 | 5/2015 | Ratschmann et al. |
| 2015/0155654 A1 | 6/2015 | Ferry |
| 2015/0189140 A1 | 7/2015 | Sutton et al. |
| 2015/0212653 A1 | 7/2015 | Cable et al. |
| 2015/0244930 A1 | 8/2015 | Ettinger et al. |
| 2015/0323112 A1 | 11/2015 | Wright |
| 2015/0345663 A1 | 12/2015 | Jiang et al. |
| 2015/0345683 A1 | 12/2015 | Crompton et al. |
| 2015/0358539 A1 | 12/2015 | Catt |
| 2015/0373279 A1 | 12/2015 | Osborne et al. |
| 2016/0018030 A1 * | 1/2016 | Arstein ............... F16L 19/061 |
| | | 285/389 |
| 2016/0073104 A1 | 3/2016 | Hillebrand et al. |
| 2016/0088280 A1 | 3/2016 | Sadi et al. |
| 2016/0131289 A1 | 5/2016 | Spears et al. |
| 2016/0161038 A1 | 6/2016 | Crompton et al. |
| 2016/0198087 A1 | 7/2016 | Georgiev et al. |
| 2016/0219217 A1 | 7/2016 | Williams et al. |
| 2016/0290538 A1 | 10/2016 | Kawanishi |
| 2016/0360104 A1 | 12/2016 | Zhang et al. |
| 2017/0126971 A1 | 5/2017 | Evans et al. |
| 2017/0163889 A1 | 6/2017 | Evans et al. |

FOREIGN PATENT DOCUMENTS

| | | |
|---|---|---|
| DE | 4304241 | 8/1994 |
| EP | 0272988 | 6/1988 |
| EP | 0610538 | 8/1994 |
| EP | 1004805 | 5/2000 |
| EP | 1521027 | 4/2005 |
| EP | 1564473 | 8/2005 |
| EP | 2133612 | 12/2009 |
| EP | 2256394 | 12/2010 |
| EP | 2511583 | 10/2012 |
| GB | 2146400 | 4/1985 |
| GB | 2328259 | 8/2002 |
| JP | 2001032984 | 2/2001 |
| WO | 1999039124 | 8/1999 |
| WO | 2000079173 | 12/2000 |
| WO | 2001094798 | 12/2001 |
| WO | 2013056273 | 4/2013 |
| WO | 2014106296 | 7/2014 |

* cited by examiner

FITTING DEVICE, ARRANGEMENT AND METHOD

TECHNICAL FIELD

The present disclosure relates to piping conduits, and more particularly to a push-to-connect fitting device, arrangement and method that facilitates the connection of piping and tubing system parts.

BACKGROUND ART

Piping systems exist to facilitate the flow of fluids (e.g., liquid, gas (such as air) or plasma), contain contents internally and provide other functions. For example, piping systems can include conduits that maintain electrical wiring, effectively bundling and containing wiring within a confined and protected area, so that the inserted wires can be collectively transported, shielded and joined from one point to another. In many instances, one of the end points for the conduit is an electrical box.

Conduits or piping connections for managing loose wires are generally tube-shaped elements with a hollow interior for permitting wiring to pass through. Such conduits are useful in properly protecting the wires and cables contained therein. If unprotected, the loose wires and/or cables can be damaged, cut (such as against a metal edge of the electrical box opening) and can potentially cause a short circuit, shock, or fire. While code regulations exist to help prevent these problems, various installations may not meet code requirements. When traditional conduits are positioned within an electrical box opening, they may be unsecured, or possibly secured through a basic form of attachment such as a threaded engagement. Further, problems can arise when conductivity is not maintained between an inserted piping element and a ground connection. Electrical conduits can be made of metal, fiber, plastic and other materials. Non-metal conduit materials, such as PVC, are typically less expensive and lighter in weight.

In recent years, push-fit technology has been employed with piping systems, and particularly with plumbing systems, to reduce the dangers and time involved in soldering joints and other connection methods. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology. The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw™, Blue-Hawk™, CopperHead® and Push Connect® lines of push fittings and related products. Also, such technology is described, for example, in U.S. Pat. Nos. 7,862,089, 7,942,161, 8,205,915, 8,210,576, 8,398,122, 8,480,134, 8,844,974, 8,844,981, 9,068,680, and 9,217,529, the disclosures of which are incorporated herein by reference in their entireties.

SUMMARY OF ASPECTS OF THE DISCLOSURE

The present disclosure relates to, in part, a push-to-connect fitting device, arrangement and method that facilitates management of multiple wires, cables and/or connections in electrical environments in a manner that meets requirements, saves time for professionals and can maintain conductivity to a ground connection. Embodiments of the present disclosure require no coining and can connect piping elements without glue and/or ultrasonic welding. In addition to electrical environments, embodiments of the present disclosure can also be employed with irrigation and other fluid flow environments.

In various embodiments, a conduit device according to the present disclosure includes an interior surface adapted to securely retain a packing arrangement comprising at least one sealing ring, a spacer gland and a grip ring. The packing arrangement can further include a tube support member and a release pusher. Among other things, it will be appreciated that embodiments disclosed herein assist production efforts by eliminating the time required for creating multiple molds associated with other push-to-connect technologies.

For purposes of the present disclosure, the term "tube", "pipe", "piping", "conduit", "conduit element" or "piping element" will be understood to encompass one or more pipes, tubes, conduits, piping elements and/or tubing elements, and may be used interchangeably. Further, for purposes of the present disclosure, a fitting can encompass a valve member and other piping elements including, but not limited to: a coupling joint, an elbow joint, a tee joint, a stop end, a ball valve member, tubing and other objects having substantially cylindrical openings. Further, for purposes of the present disclosure, a fitting (also referred to as a body member or main body component) can encompass a valve member and other piping elements including, but not limited to: a coupling joint, an elbow joint, a tee joint, a stop end, a ball valve member, tubing and other objects having cylindrical openings. In various embodiments, the fitting includes an axially inner portion having an interior radius that increases from a tube stop to an axially outer rim of the axially inner portion. In various embodiments, one or more sealing member gasket inserts (e.g., O-ring members) fit within a first sealing ring compartment defined in the interior surface of the fitting. In addition, at each pipe receiving end of the fitting, a tube support member compartment is machined into the interior to retain at least a portion of the packing arrangement. The fitting interior is formed to provide integrated support for the sealing member(s) and fastening ring when opposing force is applied to piping elements that have been inserted into the fitting. In various embodiments, a tube support member is employed to provide additional support for the fastening ring and to cooperate with an optional release pusher to facilitate connection and disconnection of piping elements. Other methods, devices and arrangements associated with the present disclosure are described herein.

DETAILED DESCRIPTION OF THE PREFERRED EMBODIMENTS

Figure 1:
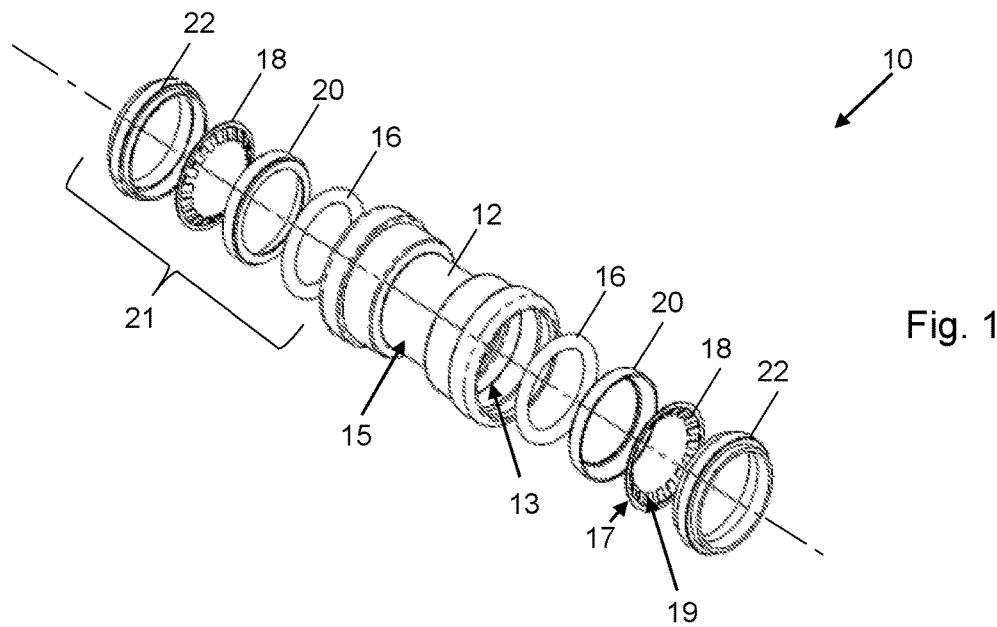
FIG. 1 is an exploded front perspective view of one embodiment of a fitting assembly in accordance with the present disclosure.
Figure 2:
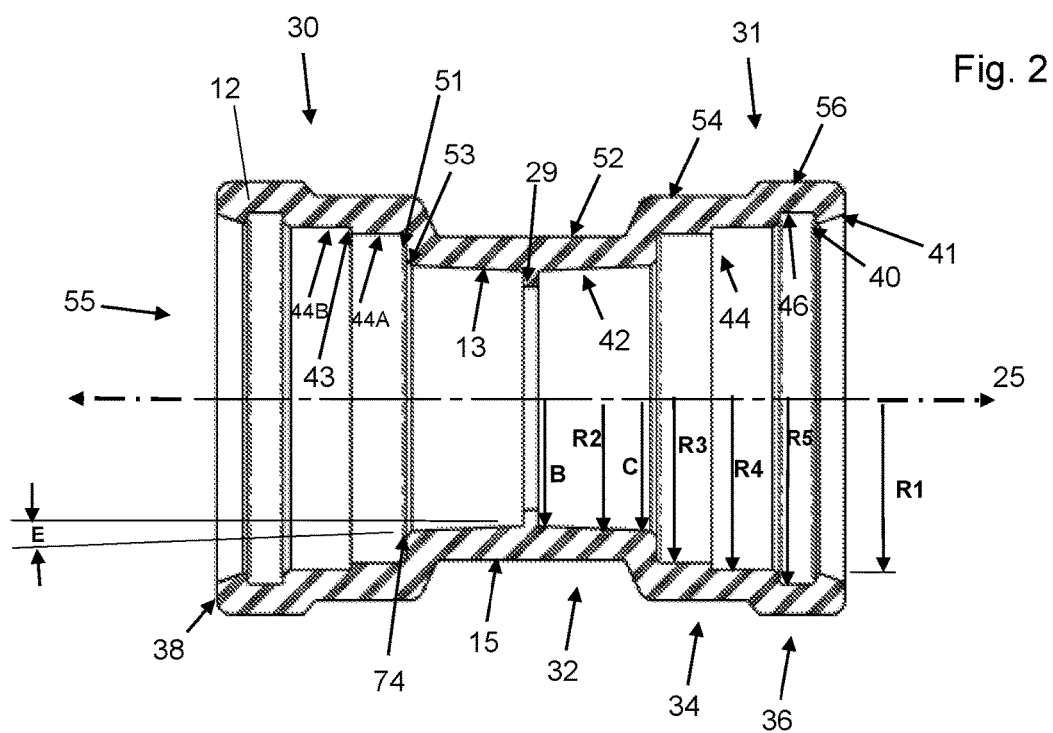
FIG. 2 is a front cross-sectional view of one embodiment of a fitting in accordance with the present disclosure.
Figure 3:
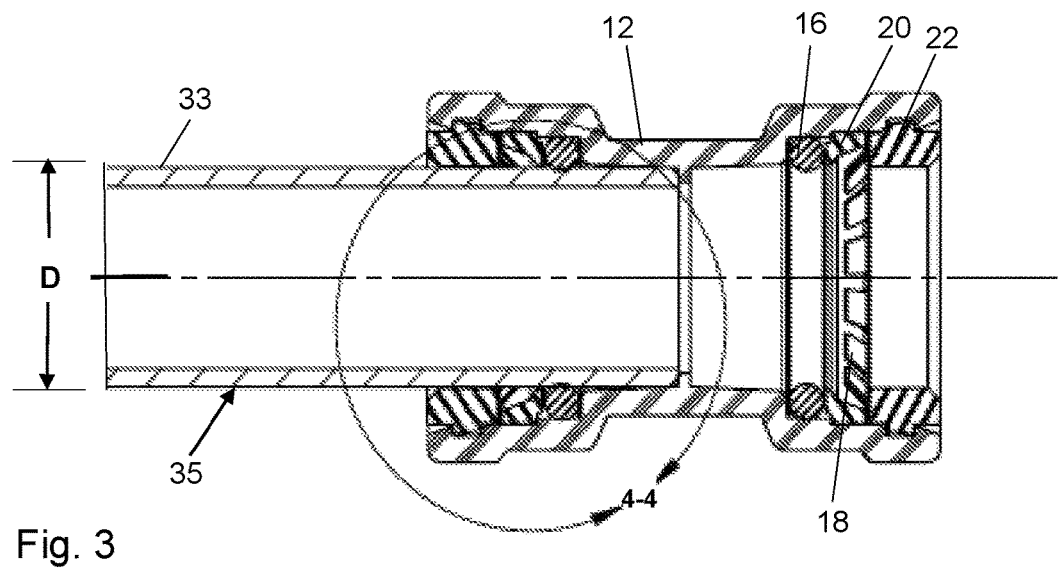
FIG. 3 is a front cross-sectional view of the fitting of FIG. 2 with inserted fitting elements and an inserted piping element.
Figure 4:
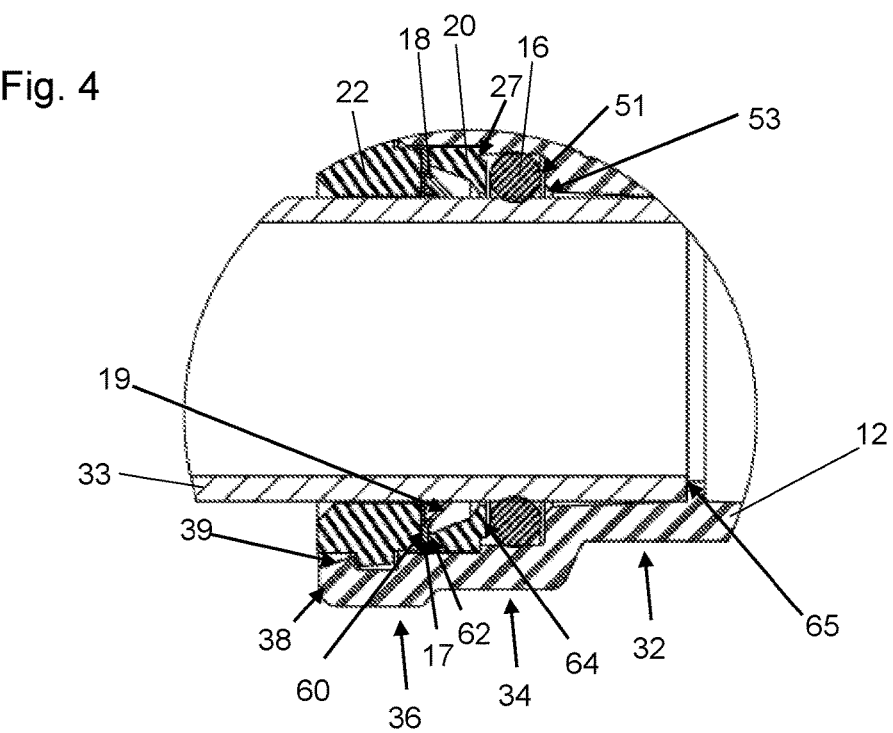
FIG. 4 is a detailed cross-sectional view of encircled portion 4-4 of FIG. 3.

In the push-to-connect fitting assembly 10 according to embodiments of the present disclosure as shown in FIGS. 1 through 5, elements of the assembly as shown include: a fitting (i.e., fitting body member or main body component) 12 having an interior surface 13 and exterior surface 15, a fastening ring 18, one or more sealing members 16 (which can optionally be lubricated), a sealing ring support member 20, and a tube support member 22. In various embodiments, the fitting interior surface 13 is formed via forging and/or machining and is not coined. The fastening ring 18 and sealing member 16 together provide one embodiment of a packing arrangement 21 disclosed herein, and each has an internal diameter that allows for smooth and snug engagement of a piping or tubing element external surface 35 (shown in FIG. 3) when inserted into the opening 55 (shown in FIGS. 2 and 5), which is defined by the fitting interior surface 13 and extends axially therethrough along axis 25. In one embodiment, the interior diameters of the fastening ring 18 (as measured to the teeth 19 and not the ring cylindrical base 17) and sealing member 16 are substantially the same. Further, the interior diameters of the fastening ring 18 and sealing member 16 are slightly less than that of the fitting 12 so as to facilitate proper operation of the presently disclosed device and arrangement. Optionally, a release pusher (not shown) can be provided to facilitate the release of tubing, piping and other cylindrical objects (e.g., 33) inserted into the fitting 12. When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed. In various embodiments, as shown in FIGS. 3 and 4, no release pusher is provided or required, and the packing arrangement 21 is thus permanently maintained within the fitting body component 12. Details surrounding the packing arrangement 21 and internal elements 16, 18, 20 and 22, including the optional release pusher can be found, for example, in U.S. Pat. No. 9,322,496 to Crompton et al., the disclosure of which is incorporated by reference herein in its entirety.

Figure 5:
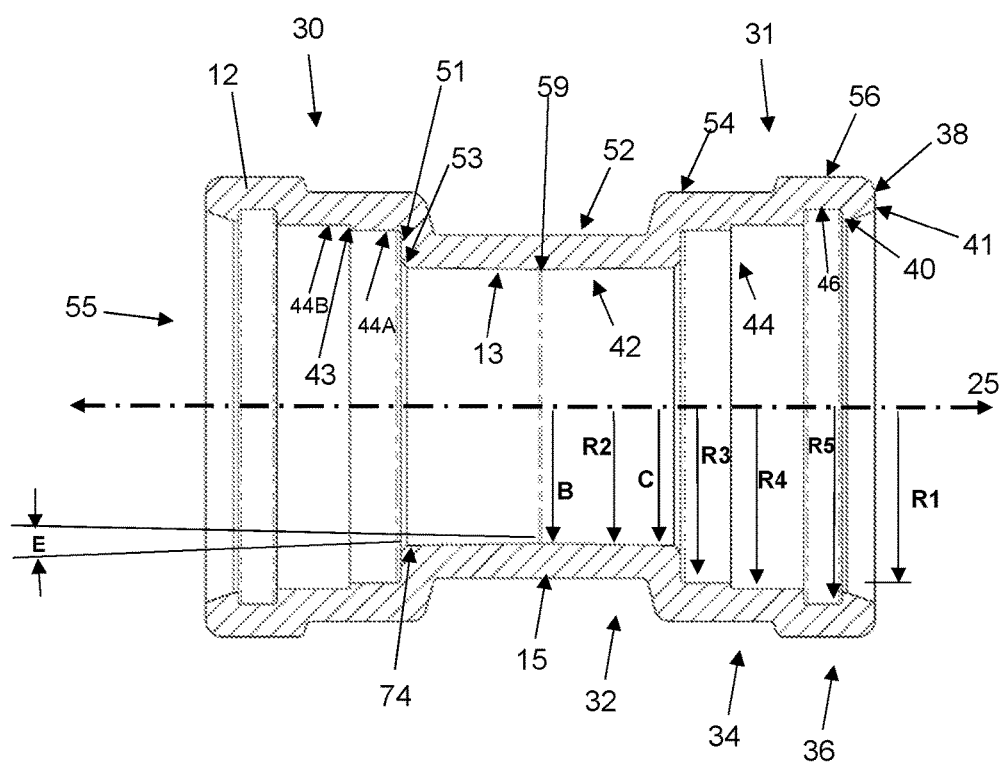
FIG. 5 is a front cross-sectional view of an alternative embodiment of a fitting in accordance with the present disclosure.

As further shown in FIGS. 2 through 4, the main body component 12 includes first 30 and second 31 segments, divided by a tube stop 29. The tube stop 29 extends radially inwardly of the inner surface 13 in order to provide a stopping surface for inserted tubes and pipes. In the embodiment shown in FIG. 5, no tube stop 29 is provided. However, the tapered internal surface 13 at the axially inner portion 32 of the fitting 12 provides an effective stopping surface for inserted tubes and pipes, without the need for a tube stop as in FIG. 2. Each of the first 30 and second 31 segments includes an axially inner portion 32, an axially intermediate portion 34 and an axially outer portion 36, with the axially inner portion 32, axially intermediate portion 34 and axially outer portion 36 being integrally formed and each having a respective interior wall 42, 44, 46 and exterior wall 52, 54, 56. As shown in FIGS. 2 and 5, axially inner portion 32 has an interior radius R2. Axially intermediate portion 34 has an interior radius R3 and/or R4. Axially outer portion 36 has an interior radius R5. In various embodiments, the interior radius R3 and/or R4 of the axially intermediate portion 34 is larger than the interior radius R2 of the axially inner portion 32, and the interior radius R5 of the axially outer portion 36 is larger than the interior radius R2 of the axially inner portion 32 and the interior radius R3 and/or R4 of the axially intermediate portion 34. In this way, and among other things, a greater sized opening is provided at the pipe or tubing entry area 55 on the fitting 12 and a tighter opening is provided within the axially inner portion 32. In addition, as shown in FIG. 2, the interior radius R2 of the axially inner portion is tapered from a narrower diameter B to a wider diameter C. In various embodiments, the axially internal diameter B is smaller than the diameter D (see FIG. 2) of the pipe 33 to be inserted in the opening 55, and the axially external diameter C is larger than the diameter D of the pipe to be inserted in the opening 55. In this way, the pipe or tubing 33 makes continual contact with the inner surface 13 at the axially inner portion 32 of the main body component 12, and is slightly compressed upon reaching the tube stop 29 (in FIG. 2) or the radially and axially innermost center point 59 of axially interior wall 42 (in FIG. 5). As shown in FIG. 5, the center point 59 is the radially innermost point of the interior surface 13. As such, the pipe 33 maintains conductivity with the ground via main body component 12 from the point where the pipe 33 initially makes contact with the interior surface 13 to the point where the pipe 33 is fully inserted up to the tube stop 29 or center point 59. Further, rotation of the inserted pipe 33 is prevented and/or strongly resisted by being secured within the narrower axially inner portion 32 of the main body component 12.

As further shown in FIGS. 2 through 5, the axially outer portion 36 of the first segment 30 terminates in an axially outer rim 38 that extends radially inwardly from the interior wall 46. In various embodiments, as shown in FIGS. 2 and 5, the axially outer rim 38 has an internal radius R1 that is substantially the same as the axially intermediate portion internal radius R3 or R4. In various other embodiments, the radially inner edge 39 of the axially outer rim 38 is sloped such that the radius varies from a shorter size at the axially inner edge 40 of the radially inner edge 39 to a longer size at the axially outer edge 41 of the radially inner edge 39 of the axially outer rim 38. In this way, the opening formed by the inner edge 39 for a pipe or tubing element to be inserted is more receptive to insertion angles of a pipe or tubing element that may not be perfectly aligned with the axis 25.

As further shown in FIGS. 2 through 5, the axially intermediate portion 34 can be provided with a radial step 43 extending radially inwardly such that the axially intermediate portion 34 includes a first interior wall portion 44A having an internal radius R3 and a second interior wall portion 44B having an internal radius R4, where the portions 44A and 44B are separated by the radial step 43. As described elsewhere herein, the radial step 43 assists in providing an engaging surface for the sealing ring support member 20 as part of the packing arrangement 21 provided in accordance with aspects of the present disclosure.

As shown in FIG. 4, a sealing ring 16 is maintained against ledge 51 and within the first interior wall portion 44A of the axially intermediate portion 34 of the main body component 12, and a sealing ring support member 20 is maintained partially within the first interior wall portion 44A and partially within the second interior wall portion 44B of the axially intermediate portion 34 of the main body component 12. In various embodiments, a second O-ring or sealing ring can be positioned adjacent the first sealing ring 16. Further, in various embodiments, the sealing ring support member 20 includes a notch cut-out 27 for engaging the radial step 43 to provide stabilizing support to the packing arrangement.

As shown in FIGS. 2 through 5, for example, the tube support member 22 is maintained against rim 38 and partially against the interior surface 46 of the main body component 12 and partially against the interior surface 44 at the axially intermediate portion 34 of the main body component 12. In various embodiments, the tube support member 22 can comprise a spring steel formulation, and can be provided as a unitary, unsplit member or can be provided with a split similar to the embodiment of the fastening ring described elsewhere herein.

A fastening ring 18 is maintained within the second interior wall portion 44B of the axially intermediate portion 34 of the main body component 12, with the fastening ring base 17 being held between an axially inner edge 60 of the tube support member 22 and an axially outer edge 62 of the sealing ring support member 20. The fastening ring 18, which can be an integral, unsplit ring or can be a split ring member, has a substantially circumferential base 17 with teeth 19 extending radially inwardly therefrom. In the embodiments where the fastening ring is a split ring, the fastening ring can include two circumferential end points (not shown) that do not connect, with fixture points for handling and compressing the fastening ring, such that a tool designed to hold the fastening ring at the fixture points can more easily handle and compress the fastening ring in order to assist with assembly or disassembly of embodiments disclosed herein. In this embodiment, and once compressed, the fastening ring is easily insertable into the fitting 12 by releasing the hold on the fixture points, thereby allowing the fastening ring to expand such that the circumferential base engages the walls of the second radial housing element. The fastening can be removed from the second radial housing element in similar manner. No wrenches, solder, welding, glue and/or twisting and turning the elements are required to form or disengage a connection.

The fastening ring 18 can comprise a spring steel formulation, for example, that enables the fastening ring to be malformed during installation, while springing back into its originally manufactured position once installed. The fastening ring is capable of grabbing an inserted pipe's surface via two or more teeth 19 to ensure connections cannot be pulled apart. The fastening ring teeth are angled downward from the substantially cylindrical perimeter of the ring, toward the axially inner portion 32 and away from the axially external portion 36, such that when a pipe is inserted, the teeth exert a pressure against the pipe to discourage the pipe from slipping or moving back out of the fitting. No wrenches, solder, welding, glue and/or twisting and turning the elements are required to form a connection. Specifically, the combination of the fastening ring, the O-ring support member, the tube support member and optional release pusher provide a push-fit piping assembly when inserted into any cylindrical pipe fitting in accordance with embodiments disclosed herein. The teeth 19 of the fastening ring 18 can extend at various angles from the base axis as measured when the teeth are at rest position and are not stressed by the insertion of a pipe, for example. The number of teeth can readily vary in number and size.

In one embodiment, the fitting 12 can be forged CW617N brass, with full porting and full flow fitting, for example. The lubricant for the sealing members 16 can be a food grade lubricant, for example. It will be appreciated that the sealing members 16 can comprise a flat ring or washer-type seal member in addition or as an alternative to a circular member of substantially circular cross-section. As shown in FIG. 4, the sealing ring support member 20 has an axially inner edge 64 that acts as a sealing member-engaging surface and an axially outer edge 62 that acts as a fastening ring-engaging surface. The sealing ring support member 20 can be comprised of metal or plastic, for example.

In operation, the main body component 12 is formed with the tapered axially inner segment 42 and compartments as described above, and one or more sealing members 16 are inserted into the axially intermediate portion 34 of the main body component 12 and retained against the first interior wall portion 44A thereof. Next, the sealing ring support member 20 is inserted so as to fit snugly within the axially intermediate portion 34 of the main body component 12, and retained against the first 44A and second 44B interior wall portions. The support member 20 abuts the sealing ring member 16, as shown in FIG. 3, for example. The fastening ring 18 is then inserted such that its base 17 is securely retained against the second interior wall portion 44B of the axially intermediate portion 34 of the main body component 12, and the base is further securely retained between the sealing ring support member 20 and the tube support member 22. The tube support member 20 is inserted so as to be retained in the axially outer portion 36 and the second interior wall portion 44B of the axially intermediate portion 34 of the main body component 12, as well as against the inner surface of the outer rim 38 of the main body component 12. In embodiments with the optional release pusher, the release pusher can then be inserted so as to slidingly engage the radially inner wall of the tube support member 20.

When a pipe 33 is inserted, as shown in FIGS. 3 and 4, it travels over the tube support member 20 into the pipe receiving cavity 55 of the main body component 12, engaging the fastening ring 18 and the sealing member 16. As the pipe 33 is fully inserted (i.e., when the leading edge 65 of the pipe contacts tube stop 29 in FIG. 2, or point 59 in FIG. 5), the teeth 19 of the fastening ring 18 engage the outer surface 35 of the inserted pipe 33 and the narrower axially inner end of the axially inner portion 42 compresses the outer surface 35 of the pipe 33 in order to retain the pipe 33 securely within the main body component 12. In various embodiments, the piping element 33 has an outer diameter D that is larger than the internal diameter of the interior surface 13 of the axially inner portion 42 of the first segment 30, primarily closer to the tube stop 29 or point 59 as the axially inner portion narrows in diameter. In particular embodiments, the piping element outer diameter D is at least 0.002 inches larger than the internal diameter of the interior surface 13 of the axially inner portion 42 of the first segment 30 at or near the tube stop 29 (FIG. 2) or point 59 (FIG. 5). The sealing member 18 helps to provide a strong, leak-free seal and the combination of the sealing ring support member 20, the fastening ring 18, the tube support member 22 and the narrower internal cavity of the axially inner portion 42 of the main body component 12 prohibit any inclination an inserted pipe may have to slide out of position.

In various embodiments, as shown in FIG. 2, for example, the axially inner portion 42 extends from the tube stop 29 to an axially outer rim 74 of the axially inner portion 42, wherein the interior radius R2 of the axially inner portion 42 increases from the tube stop 29 to the axially outer rim 74 of the axially inner portion 42. In various embodiments, as shown in FIG. 5, for example, the axially inner portion 42 extends from the axially and radially inner point 59 to an axially outer rim 74 of the axially inner portion 42, wherein the interior radius R2 of the axially inner portion 42 increases from the point 59 to the axially outer rim 74 of the axially inner portion 42.

In various embodiments, the interior surface 13 of the axially inner portion 42 extends at an acute angle E to the axis 25 from the tube stop 29 in FIG. 2 or point 59 in FIG. 5 to the axially outer rim 74 of the axially inner portion 42. In various embodiments, the acute angle E is from approximately 0.005 degrees to approximately twenty degrees. In specific embodiments, the acute angle E is from approximately 0.005 degrees to approximately five degrees. By employing angles within the ranges described, the device ensures adequate contact with the inserted pipe for grounding, while also ensuring the ability to maintain a push-connect operation with the fitting packing arrangement and ensuring that the inserted piping element cannot be rotated when fully inserted. Thus, the tapered interior as described herein facilitates several important purposes. In various embodiments, as shown in FIGS. 2 and 4, the ledge 51 extends radially outwardly from the axially outer rim 74 of the axially inner portion 42 of the first segment 30 to the axially intermediate portion 44 of the first segment 30. Additionally, the interior surface 13 further comprises a ramp 53 extending axially and radially inwardly from the ledge 51 to the axially outer rim 74.

It will be appreciated that the main body component 12 can act as a coupling with the first 30 and second 31 segments largely being mirror images of one another. In such embodiments, the axially inner portion of the second segment extends from the tube stop to an axially outer rim, and the interior radius of the axially inner portion of the second segment increases from the tube stop to the axially outer rim.

The angles, dimensions and materials described herein will be understood to be exemplary and provided as embodiments associated with proper working operation of the device, assembly and method as presently disclosed. Further, it will be appreciated that, in various embodiments, the members of the push connect joint assembly can be formed through hydroforming processes. Additionally, embodiments can be provided whereby the fitting and/or main body component includes independent packing arrangements on both sides of the tube stop 29 or point 59, where the packing arrangements each comprise at least one of the following: sealing ring, sealing ring support member, fastening ring, tube support member, release pusher, as shown in FIGS. 2 and 3, for example.

The device, assembly and method as presently disclosed may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A fitting, comprising:
a main body component comprising an interior surface and an exterior surface, wherein the interior surface defines a cavity extending along an axis through the main body component, wherein the main body component further comprises a first segment having an axially inner portion, an axially intermediate portion and an axially outer portion, with the axially inner portion, axially intermediate portion and axially outer portion of the first segment being integrally formed and each comprising a respective interior radius from the axis to the interior surface, wherein the interior surface extends at a first acute angle to the axis from a radially innermost point of the interior surface to an axially outer rim of the axially inner portion of the first segment of the main body component, wherein the main body component further comprises a second segment having a second segment axially inner portion, wherein the interior surface extends at a second acute angle to the axis from the radially innermost point of the interior surface to an axially outer rim of the second segment axially inner portion, wherein the axially outer portion comprises an axially outer rim extending radially inwardly from the interior surface of the main body component, wherein the axially outer rim comprises a radially inner edge having an axially inner edge and an axially outer edge, wherein the axially inner edge of the radially inner edge of the axially outer rim has an internal radius that is substantially the same as the interior radius of the axially intermediate portion of the first segment of the main body component, wherein the internal radius of the axially inner edge of the radially inner edge of the axially outer rim is less than the internal radius of the axially outer edge of the radially inner edge of the axially outer rim, and wherein the first element is configured to receive a piping element abutting the radially innermost point of the interior surface, wherein the received piping element has an outer diameter that is larger than an internal diameter of the radially innermost point of the interior surface.

2. The fitting of claim 1, wherein the interior radius of the axially intermediate portion is larger than the interior radius of the axially inner portion.

3. The fitting of claim 1, wherein the interior radius of the axially outer portion is larger than the interior radius of the axially intermediate portion.

4. The fitting of claim 1, wherein the interior radius of the axially intermediate portion is larger than the interior radius of the axially inner portion, and wherein the interior radius of the axially outer portion is larger than the interior radius of the axially inner portion and the interior radius of the axially intermediate portion.

5. The fitting of claim 1, wherein the interior surface comprises a ledge extending radially outwardly from the axially outer rim of the axially inner portion of the first segment to the axially intermediate portion of the first segment.

6. The fitting of claim 5, wherein the interior surface further comprises a ramp extending axially and radially inwardly from the ledge to the axially outer rim.

7. The fitting of claim 1, wherein the axially intermediate portion includes a radial step extending radially inwardly such that the axially intermediate portion includes a first interior surface portion and a second interior surface portion separated by the radial step.

8. The fitting of claim 1, wherein the radially innermost point of the interior surface is the axially innermost point of the axially inner portion of the first segment, and wherein the radially innermost point of the interior surface is further the axially innermost point of the second segment axially inner portion.

9. A method of forming a fitting conduit, comprising:
forming a main body component with an interior surface and an exterior surface, wherein the interior surface defines a cavity extending along an axis through the main body component; wherein the main body component comprises a first segment having an axially inner portion, an axially intermediate portion and an axially outer portion, with the axially inner portion, axially intermediate portion and axially outer portion of the first segment being integrally formed and each comprising a respective interior radius from the axis to the interior surface, wherein the interior surface is formed so as to extend at a first acute angle to the axis from a radially innermost point of the interior surface to an axially outer rim of the axially inner portion of the first segment of the main body component, wherein the main body component further comprises a second segment having a second segment axially inner portion, and wherein the interior surface extends at a second acute angle to the axis from the radially innermost point of the interior surface to an axially outer rim of the second segment axially inner portion, wherein the axially outer portion comprises an axially outer rim extending radially inwardly from the interior surface of the main body component, wherein the axially outer rim comprises a radially inner edge having an axially inner edge and an axially outer edge, wherein the axially inner edge of the radially inner edge of the axially outer rim has an internal radius that is substantially the same as the interior radius of the axially intermediate portion of the first segment of the main body component, and further wherein the internal radius of the axially inner edge of the radially inner edge of the axially outer rim is less than the internal radius of the axially outer edge of the radially inner edge of the axially outer rim; and
inserting a piping element within the first segment of the main body component so as to abut the radially innermost point of the interior surface, wherein the interior surface of the main body component has an internal diameter, and wherein the piping element has an outer diameter that is larger than the internal diameter of the radially innermost point of the interior surface.

10. The method of claim 9, wherein the radially innermost point of the interior surface is the axially innermost point of the axially inner portion of the first segment, and wherein the radially innermost point of the interior surface is further the axially innermost point of the second segment axially inner portion.

11. The method of claim 9, wherein the acute angle is from approximately 0.005 degrees to approximately five degrees.

12. The method of claim 9, wherein the piping element outer diameter is at least 0.002 inches larger than the internal diameter of the radially innermost point of the interior surface.

* * * * *